June 17, 1952   C. C. BLAND   2,600,963
METHOD AND APPARATUS FOR FORMING GLASS BEADS
Filed April 8, 1948   2 SHEETS—SHEET 1
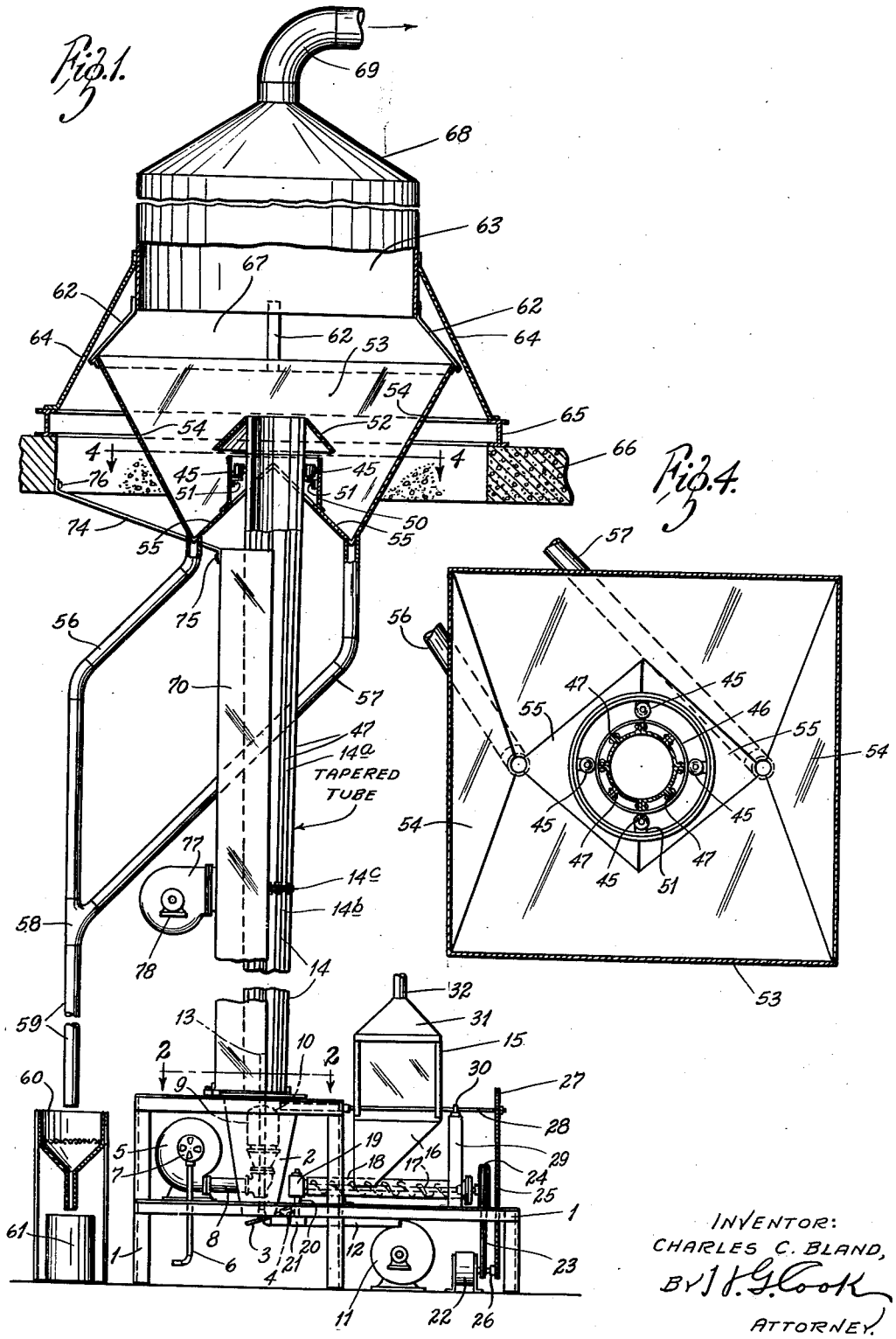

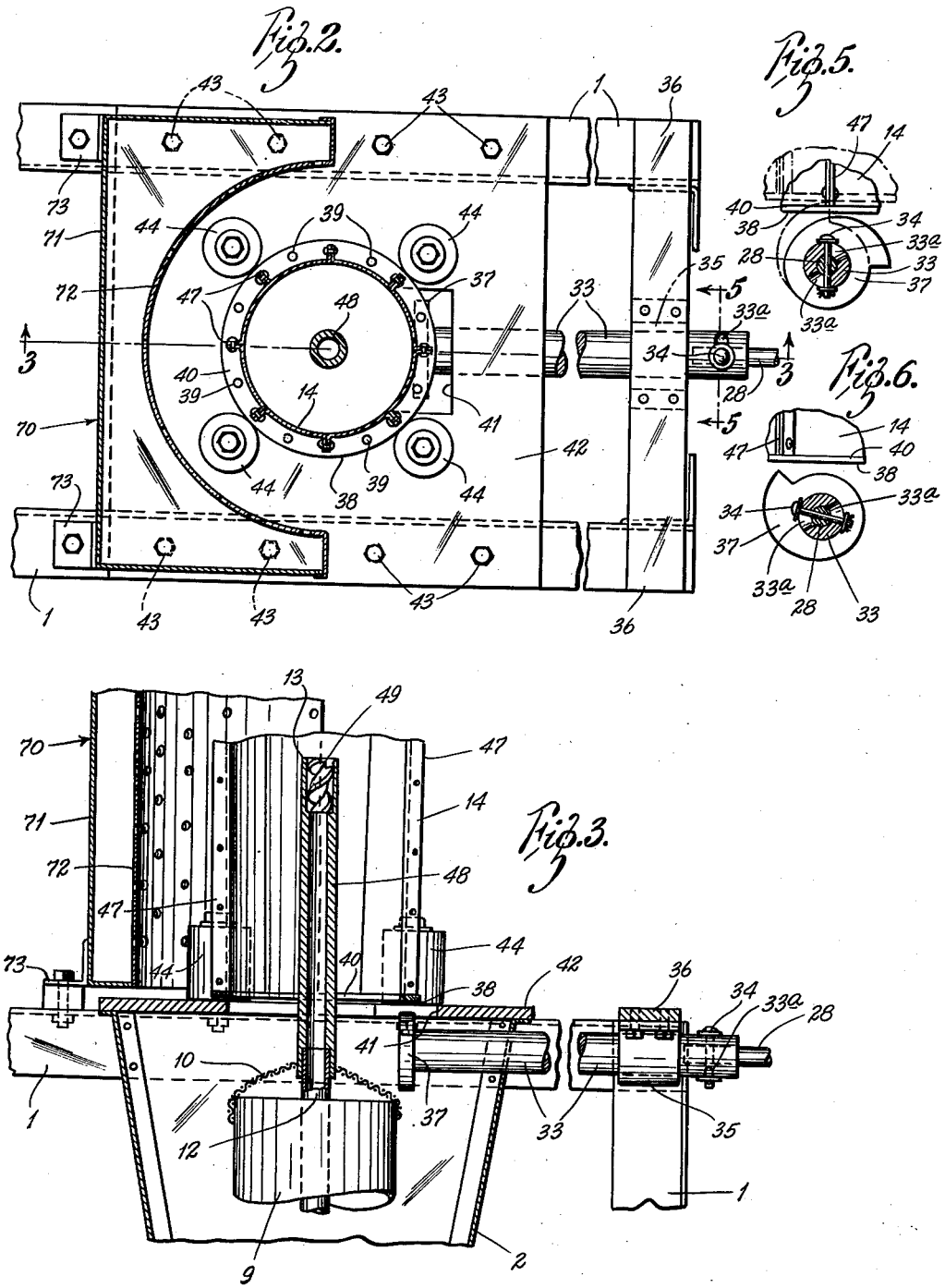

Patented June 17, 1952

2,600,963

UNITED STATES PATENT OFFICE 2,600,963

METHOD AND APPARATUS FOR FORMING GLASS BEADS

Charles C. Bland, St. Louis, Mo.

Application April 8, 1948, Serial No. 19,738

10 Claims. (Cl. 49—58)

In the formation of minute glass beads it frequently happens that some of the beads have a chalky or milky appearance when viewed under a magnifying glass, and the material comprising this chalky or milky substance is a part of the structure of the bead with which it is identified. These beads are usually applied to a surface by means of a paint or adhesive to cause the firm adhesion of the beads to such surface. The beads which have the chalky or milky substance therein are deposited with other clear beads, and it has been found that this chalky or milky substance attacks the paint or adhesive, causing a deterioration of the surrounding paint or adhesive and forms a dark spot or splotch which increases in size in the course of time. Such spots are objectionable, and particularly so on a moving picture screen. I believe that this chalky or milky condition is caused by contact of some of the beads with the inner wall of the tube in which the beads are being formed, and some of the beads during such contact acquire a minute portion of the material of the inside of the tube. In some instances a chalk-like liner, or coating, is the inside material of the tube, and the highly heated glass beads when traveling strike against such liner, or coating, and have an inclination to pick up some of this chalk-like substance.

In my method and apparatus I have produced minute beads that are free from any deleterious material such as has been found in prior beads, particularly those formed in a tube with an inner lining or coating of a chalky material. Also in my method and apparatus I have materially reduced the amount of slag formed during the operation of the apparatus, which slag, being reasonably pure, can be recrushed and used again to form beads. I have found that in producing a high degree of acceptable beads it is necessary that the minutely crushed glass particles of irregular shape from which said beads are formed be kept in contact with highly heated gases in a tube while said particles are in a freely moving condition, and for such length of time as to permit these particles to become soft enough to readily fuse into beads and to then conduct such beads out of the heated zone of the tube into a collection receptacle from which they can be removed for screening and packaging. It is also highly desirable that the apparatus and method employed shall allow little, if any, escape of these glass beads or dust to the outside atmosphere.

In the drawings—

Fig. 1 is an elevational view partly broken away and partly in section to show the apparatus which I employ in the formation of glass beads.

Fig. 2 is an enlarged view taken on line 2—2, Fig. 1, illustrating particularly the tube and the means for cooling the same.

Fig. 3 is a view taken on line 3—3, Fig. 2, showing the apparatus through which ground glass particles are introduced into the lower end of the tube.

Fig. 4 is a view taken on line 4—4, Fig. 1, showing the upper portion of the tube and a W-shaped hopper for collecting beads as they are discharged from the tube.

Fig. 5 is an enlarged view taken on line 5—5, Fig. 2, illustrating the cam for imparting a vertical and rotary movement to the tube.

Fig. 6 is a view similar to Fig. 5, illustrating the cam out of contact with the tube.

The invention comprises a base frame 1, preferably constructed of steel angles riveted or welded together. Mounted on this base frame 1 is a cabinet or enclosure 2 provided with a swinging bottom portion 3 which can be so weighted, as at 4, as to cause it to remain generally in the partly open position shown in the lower part of Fig. 1. Also mounted on the base 1 is a gas-air mixing blower 5, which receives a supply of gas through a pipe 6 controlled by any suitable valve (not shown) for regulating the flow of gas therethrough. Air is admitted to the blower 5 through a damper 7 which controls the amount of primary air mixed in the blower 5 with the gas through pipe 6 and discharged from said blower through the pipe 8 into an upwardly extending burner-nozzle 9, the upper portion of which burner-nozzle is covered by a wire screen 10. I prefer to have a very rich gas mixture where it is discharged from the burner-nozzle 9 and where it is ignited. The cabinet 2 preferably surrounds the burner-nozzle 9.

Also mounted on the base frame 1 is an air blower 11 which forces air through a pipe 12 up through the center of the burner-nozzle 9, discharging said air at 13 into the lower portion of a vertically disposed metal tube 14 a short distance above the bottom of said tube.

Also mounted on the base frame 1 is a crushed glass receiving receptacle 15 having one open side for introduction of the crushed glass, the bottom of said receptacle being preferably formed of wire screening (not shown) through which the glass particles pass into a hopper 16, where they are deposited on a horizontally disposed worm feed 17 enclosed within a tube 18, which is mounted on the base frame 1. The crushed glass is discharged from one end of the worm feed 17 into a T-shaped element 19 and passes through a pipe 20 into the pipe 12, the connection between the pipes 12 and 20 being as shown at 21, and is there mixed with the air from the blower 11 and passes with such air at a rather high rate of velocity through the pipe 12 up into the bottom portion of the metal tube 14. The rotation of the worm feed 17 is caused by a motor 22 connecting through a V-belt 23 with a V-pulley 24 attached to the end of the worm feed 17. The reason for using the V-belt drive is that should the worm feed 17 get clogged, the V-belt can slip on the pulley 24 without injuring the worm feed 17.

A chain belt 25 extends from a sprocket on the shaft 26 of the motor 22 to a sprocket 27 mounted on the end of a shaft 28 to rotate said shaft, said shaft being mounted on a standard 29 in a bearing 30. Any suitable speed reducing mechanism may be interposed between the motor 22 and the worm feed 17 and shaft 28 to regulate the speed of rotation of said worm feed and shaft. The upper portion of the glass receiving receptacle 15 has a tapered head 31 and a pipe 32 leading from said head to a dust collecting receptacle (not shown).

The shaft 28 is connected with a cam shaft 33 by means of a pin 34 (Fig. 3) which is passed through suitable apertures 33ᵃ in an end of the cam shaft 33 (Fig. 6). The pin 34 also passes through an end of the shaft 28 and through the apertures 33ᵃ, thereby connecting said shaft 28 to the cam shaft 33. The cam shaft 33 is held in position by a bearing 35 which is secured to a cross-arm 36, which in turn is secured at each end of the base frame 1 (Fig. 2). A cam 37 is secured to one end of the cam shaft 33 and contacts a wear plate 38 riveted, as at 39, to a ring 40 secured to the bottom of the stack 14. This wear ring can be renewed when it becomes worn by cutting the rivets 39, inserting a new wear plate, and riveting it to the ring 40. If desired, bolts may be substituted for rivets. The cam shaft 33 is rotated through the shaft 28 and pin 34, said shaft 28 being driven by the chain belt 25 connected to the motor 22.

The cam 37 projects through an opening 41 in a plate 42, and as said cam rotates it comes in contact with the wear plate 38 on the bottom portion of the plate 40 secured to the lower end of the tube 14, and by virtue of such contact it raises the tube 14 and imparts a rotary movement thereto throughout the period of contact. In Fig. 5 the cam 37 is shown in full lines out of contact with the wear plate 38 at the bottom of the tube 14, just before it contacts the wear plate 38, and in broken lines it is shown just before it is disengaged from the wear plate 38. The tube, when not engaged by the cam 37, can only descend to the point where the wear plate 38 contacts the upper face of the plate 42 and well out of contact with the cam 37. The plate 42 is secured by bolts 43 to the base frame 1 (Fig. 2).

Where the pin 34 passes through the apertures 33ᵃ at one end of cam shaft 33 and is being constantly rotated by the shaft 28, as shown in Fig. 5, said pin 34 contacts edges of the apertures 33ᵃ for rotating said cam shaft 33 until the cam 37 is thrown out of contact with wear plate 38 on the lower portion of the tube 14, which permits the cam 37 to move quickly into the position shown in Fig. 6, thus causing the pin 34 to contact with the opposite edges of the apertures 33ᵃ and be in position to pick up the cam shaft 33 when the shaft 28 has rotated a sufficient distance to cause said pin 34 to contact with the opposite edges of the apertures 33ᵃ for again imparting rotary motion to cam shaft 33.

The tube 14 is maintained in vertical position by a series of four rollers 44 mounted on the plate 42 and contacting the outer edge of ring 40 for holding the bottom portion of the tube in place, and the top of the tube is held in position by four rollers 45 contacting a ring 46 at the upper portion of the tube 14. This permits the tube to rotate freely and move vertically while being held firmly in upright position. It will be noted in Fig. 2 that the rollers 44 contact the outer edge of the ring 38 which is secured to the bottom edge of the tube 14. The rollers 45 contact with the ring 46 attached to the upper portion of the tube, as shown clearly in Fig. 4.

The tube 14 may be formed of any suitable metal, such as ordinary steel, or stainless steel. I have found it more expedient to form the tube in sections of 16 gauge metal sheets, turning the outer longitudinal edges of the same at right angles so that when these sheets have been curved transversely the right angle portions will contact and can be riveted or spot welded together to form a series of outwardly extending, longitudinal ribs, as shown at 47. By providing the ribs 47 I materially strengthen the tube 14, which is formed of relatively thin gauge metal, and thus form a substantial structure for withstanding the shock when the tube is elevated and permitted to drop rapidly and strike against the plate 42. The ribs 47 also radiate heat from the tube 14, which I have found to be quite desirable in the formation of a large proportion of acceptable beads.

It will be noted that the tube 14 tapers gradually from bottom to top, its greatest diameter being at the top. The purpose of this is to permit the ascending current of glass particles and heated gases to expand and slightly diminish their upward speed, thus allowing greater dispersion of the glass particles and preventing contact of the same with each other while in a fusible condition and possible amalgamation to form undesirable clusters of glass particles, or slag. Also by the tapering of my tube I produce a greater quantity of acceptable spheres of a predetermined diameter.

In Fig. 1 I have shown the tube 14 formed in two sections 14ᵃ and 14ᵇ, respectively, which sections may be bolted together as shown at 14ᶜ, for the purpose of taking the tube down and separating the sections so that they may be thoroughly cleaned when necessary. As many sections can be used as may be required. By intermittently rotating and dropping the tube 14, cooling the outer surface of said tube, and by tapering said tube to permit greater dispersion of the glass particles, I have found that the tube sections can be used for a much longer period of time without the necessity of cleaning than in any other structure of like nature with which I am acquainted.

The pipe 12 terminates shortly above the screen 10 on the burner-nozzle 9. An upwardly extending pipe 48 is mounted on the top of pipe 12, and in order that it may be securely seated on the upper portion of the pipe 12 I ream out the lower interior portion of said pipe 48 so that the reamed out portion will fit snugly over the outside of the upper end of the pipe 12. It will be observed that the diameter of the pipe 48 is larger than the diameter of the pipe 12. At the top of the pipe 49 I also ream out the interior portion into which a spiral member 49 is inserted and securely held in position by friction. In view of the fact that the crushed glass is being forced rapidly by the air from the blower 11, with which said glass is thoroughly mixed, around this spiral member 49, it tends to cut the metal out of which the member 49 is formed, and in the course of time it becomes so worn that a new spiral member 49 must be substituted. In order to do this the pipe 48 is removed from the top of the pipe 12 and the spiral member 49 is driven out of the pipe 48 and replaced by a new spiral member 49. The purpose of the spiral member 49 is to impart to the combined air and crushed glass passing through said pipes 12 and 48 a whirling, upward motion at the point where the same enters the lower end of the tube 14. The purpose of this whirling, upward motion of the mixed air and glass particles is to permit the glass particles to be rapidly subjected to the action of the heated gases immediately upon their entering the lower portion of the tube 14 to begin the fusing of said particles, and as the whirling, upward motion transforms into a continued upward passage of a more or less turbulent nature, the glass particles may fuse into spheres or beads while in a freely vertically moving condition and continued contact with such heated gases, and while having more area for dispersion due to the tapering of the tube 14.

The rollers 45 which retain the upper end of the tube 14 in position are mounted on a tubular member 50, preferably by riveted support as shown at 51. To the top of the tube 14 I attach a conical shaped deflector 52, which firmly fits over the upper end of the tube 14 and tends to deflect any beads that may fall before leaving the apparatus, and to direct said beads to the bottom of a W-shaped hopper 53 (Fig. 4), which is provided with inclined surfaces 54 and 55 whereby said beads are discharged from the bottom of the W-shaped hopper 53 into pipes 56 and 57 which converge at 58 into a single pipe 59 for directing the beads into a funnel 60, and through that to a receptacle 61, from which they may be removed from time to time for grading and separating. The W-shaped hopper 53 is preferably rectangular at its top portion and has four diagonal, upwardly extending hangers 62 to each of which a drum 63 is secured, which drum also supports the W-shaped hopper. Upwardly extending members 64 support the drum 63. The lower ends of the members 64 rest on a metal member 65, preferably I-shaped in cross section, which member 65 may rest on any suitable support, such as the roof 66 of the building in which my apparatus is housed. There is a space 67 between the top of the upper rectangular portion of the W-shaped hopper 53 and the lower portion of the drum 63, which permits air to be admitted freely at this point for providing additional oxygen to the flame passing out of the tube 14. The fine bead particles move upwardly into a cone-shaped top 68 resting upon the drum 63, to which cone-shaped top 68 a pipe 69 is attached and leads to a collecting receptacle (not shown). The arrow at the top of Fig. 1 indicates that a suction is applied to the pipe 69 to pull off the minute glass beads and also prevent the escape of any glass dust particles into the surrounding atmosphere.

Partly surrounding the tube 14 is a vertical conduit 70 having an imperforate outer wall 71 and a perforate inner wall 72 curved to partially surround the tube 14. The conduit 70 is supported at its lower end upon the base frame 1, as shown at 73, preferably by bolting, and at its upper end it is secured by a member 74, one end of which is attached to the upper end of the conduit 70, as shown at 75, the other end 76 being attached to the roof 66. A blower 77 is driven by a motor 78 and supplies air to the conduit 70, as shown in Fig. 1, for cooling the tube 14.

In the operation of my apparatus a quantity of crushed glass is first placed in the receptacle 15 through the open side thereof and passes down through the hopper 16 onto the worm feed 17. The rotation of the worm feed through the motor 22 and V-belt 23 causes the crushed glass particles to be advanced through the tube 18 by the worm feed 17 into the T-shaped element 19, from which it descends by gravity into the pipe 12. The blower 11 forces air through the pipe 12, and the crushed glass particles pass into that current of air and are forced upwardly into the pipe 48 and the spiral member 49 and discharged into the lower end of the tube 14. By virtue of the spiral member 49, a whirling, upwardly directed motion is imparted to the air and ground glass particles, which causes a constant and rapid ascending movement of such air and ground glass particles in the tube 14. Due to the increase of area in the tube 14, by reason of the tapering of the same, the glass particles are more widely dispersed and their speed of upward travel somewhat diminished, thus preventing the formation of glass clusters caused by the adhesion of independent beads upon contact with each other for such length of time as to permit such adhesion, and the somewhat diminished speed of upward travel allows for the tranformation of practically all of the upwardly moving glass particles into acceptable beads or spheres.

The gas passing through pipe 6 into the blower 5 is there mixed with a small amount of air passing into the blower through the damper 7. This mixed air and gas passes through the pipe 8 into the burner-nozzle 9 and up through the screen 10, where the burning of the gas and air mixture takes place. This primary flame comprises more gas than air, being a very rich mixture at the point of combustion at the screen 10. The gas flame can obtain some additional air entering around the bottom of the tube 14, and a much greater amount from the incoming air through the pipe 48 forced therethrough by the blower 11. The upper screened end of the burner-nozzle 9 is below the bottom end of the tube 14. When the additional air passing through the pipe 48 commingles with the flame from the burner-nozzle 9, a great deal of additional heat is generated in the tube 14, and the ascending, primarily whirling glass particles are kept in contact with the ascending heated gases during the upward progress of said glass particles through the tube 14 until their discharge at the upper, enlarged end of said tube. The glass particles are always moving upwardly in the tube 14. During this upward progress the minute glass particles have been melted sufficiently to permit them to form into glass beads or spheres, to be discharged by the blast from the upper enlarged end of the tube 14. When the burning gases pass out of the upper end of the tube 14, additional air is supplied thereto through the W-shaped hopper 53 and the open space 67 between said hopper 53 and the drum 63, thus causing the complete combustion of all of the gas in said flame.

The tube is cooled by the air forced through the perforate inner wall 72 of the conduit 70 by the blower 77. The inner curved wall 72 substantially laterally surrounds half of the tube 14. The vertical ribs 47 provide radiation of heat from the tube 14, which with the air forced through the perforate wall 72 of the conduit 70 by the blower 77 disposes of a very large amount of the heat generated in the tube 14, which might be hazardous if not properly dissipated.

The tube 14 is periodically partially rotated and elevated by the cam 37, and upon disassociation of said cam from the wear plate 38 on the lower end of the tube 14, said tube drops suddenly, striking abruptly against the plate 42, which tends to disengage any glass particles that might adhere to the interior portion of the tube 14. The ribs 47 materially protect the tube 14 from damage due to such dropping. The adhering particles, usually designated as "slag," are sufficiently heavy to drop down against the ascending current of the burning gas and air and pass through the cabinet 2 and swinging bottom portion 3 into any suitable receptacle (not shown) for receiving the same, and can be recrushed and again used.

As the beads pass out of the top of the tube 14, the heavier beads will tend to fail and will strike the conical shaped deflector 52 and drop to the bottom of the W-shaped hopper 53 and pass through pipes 56, 57, and 59 into the funnel 60, and thence into the receptacle 61. The finer beads are carried upwardly by the blast of heated air and pass up and out of the top of the W-shaped hopper 53, across the space 67 into the drum 63, and thence upwardly into the cone-shaped top member 68, where they as well as all extremely fine glass particles are carried by suction through the pipe 69 to a collecting receptacle (not shown).

I claim:

1. In an apparatus of the type described, a vertical draft tube, means mounting the tube for vertical and rotating movement, including a ring secured to the lower edge of said tube, and a cam engaging said ring to impart periodical rotary and vertical movements to said tube, a source of heat below said tube so disposed as to direct heat into said tube, an inlet conduit in the lower end of the tube, means for introducing mixed air and glass particles into the inlet conduit, said conduit being provided with a spiral member to direct said air and glass particles in a whirling, upwardly directed motion into the heat in said tube to shape said glass particles into beads, and a container at the top of the tube to receive the beads which are discharged therefrom.

2. In an apparatus of the type described, a vertical draft tube, means mounting the tube for vertical and rotating movement, comprising a ring secured to the lower edge of said tube, and a cam engaging said ring to impart periodical rotary and vertical movements to said tube, an air conduit having a perforate inner wall whereby air is discharged against a portion of said tube, a source of heat below said tube so disposed as to direct heat into said tube, an inlet conduit in the lower end of the tube, means for introducing mixed air and glass particles into the inlet conduit, said conduit being provided with a spiral member to direct said air and glass particles in a whirling, upwardly directed motion into the heat in said tube to shape said glass particles into beads, and a container at the top of the tube to receive the beads which are discharged therefrom.

3. In an apparatus for making small glass beads from irregularly shaped glass particles, a vertical tube having an inlet opening at its bottom and an outlet opening at its top, means to produce an upwardly ascending flow of combustion gases from the lower end of the tube through the outlet at the top thereof of sufficient velocity to conduct glass particles continuously upwardly through and out of the top of the tube, said means including a fuel discharge means adjacent the bottom of the tube, means to supply a gas-rich fuel mixture to the discharge means under pressure to cause it to ascend into the tube, an air discharge pipe elevated above the bottom of the tube and a substantial distance above the fuel discharge means, means to discharge air upwardly from said pipe to obtain intense combustion of the gas-rich mixture approximately at and above the pipe, means to dispose the glass particles in the said air to be discharged therewith, the pipe having its discharge end vertical, a helical swirling member mounted to be stationary in said end of the pipe and having its axis vertical, the pipe extending along the sides of the helical member having its upper end open and of a diameter at least substantially as great as that of the helical member, the pipe and the helical member providing a helical path, with a vertical axis centered in the tube, and an open discharge end, for the discharging particles, whereby the particles enter the lower end of the tube, with an upward spiralling path centrally of the tube.

4. In a method of producing small glass beads in a vertical circular tube, the steps of introducing a combustion gas vertically upward into the bottom of the tube under predetermined pressure, discharging irregularly shaped small glass particles entrained in air, medially of the tube, in an upward, spiralling path, thereby mixing the gas and air, producing combustion in the tube, continuously elevating the particles in the tube by the upwardly spiralling burning gases, and by said spiralling increasing the dwell of the particles within the tube during their ascent through it, heating the particles during such elevation and causing them to assume spherical shapes, and discharging the spherically shaped particles from the top of the tube.

5. In a method of making small glass beads from irregular glass particles, the steps of producing a confined, upwardly traveling column of a combustible mixture of air and fuel gas, regulating the upward velocity of the mixture and the proportions of fuel gas and air to produce flaming substantially throughout the length of the column, introducing the particles in an upwardly spiralling flow of gas at the middle of and adjacent to the bottom of the column, maintaining the upward velocity of the gas column sufficient to carry the particles to the top of the column, fusing the particles so that they assume a spherical shape while in the column, and gradually retarding the upward velocity of the column as it moves toward the top.

6. In an apparatus for heat treating small particles, a vertical tube, means to support the tube in vertical position, means to produce a heated mass of small particles of material in suspension in the tube, including means to deliver particles and particle-suspending gas to the tube, and means to impart movement to the tube to displace it angularly about its vertical axis during suspension of the particles in the tube, and means at one side of the tube to introduce a cooling gas against the tube, the rotation of the tube bringing its surface parts successively into said gas.

7. In an apparatus for making small glass beads from irregularly shaped small particles of glass, or the like; a vertical tube mounted for up and down movement, means providing an upwardly flowing stream of hot gases through the tube of velocity to entrain the glass particles, means introducing the glass particles into the stream of hot gases adjacent the lower end of the tube and entraining them therein to cause them to ascend through the tube and to be conveyed out the top of the tube by the hot gases, and to heat them whereby they may become bead-like while so suspended; the tube having a substantially smooth inner metal surface by which the upwardly moving particles are confined, and means to elevate and lower the tube to agitate the same to reduce adherence of the glass particles to said metal surface.

8. In an apparatus for making small glass beads from irregularly shaped small particles of glass, or the like; a vertical tube mounted for up and down and angular movement, means providing an upwardly flowing stream of hot gases through the tube of velocity to entrain the glass particles, means introducing the glass particles into the stream of hot gases adjacent the lower end of the tube and entraining them therein to cause them to ascend through the tube and to be conveyed out the top of the tube by the hot gases, and to heat them whereby they may become bead-like while so suspended, means to displace the tube angularly about its axis during such upward flow of the particles and to elevate and lower the tube to agitate the same to reduce adherence of the glass particles thereto.

9. In an apparatus for making small glass beads from irregularly shaped glass particles, a vertical elongated circular tube, and means for producing an upwardly flowing stream of burning gas mixture conveying said particles from the lower part out the top of the tube, the mixture comprising two gases one of which is air and the other of which is fuel gas; the stream producing means including a discharge pipe extending into the lower part of the tube; means to produce a flow of one of said gases at high velocity through said tube and out the discharge pipe; dry feeding means to feed the glass particles into said high velocity gas, the velocity of the gas being such as to cause the particles to become entrained in the flow and to emit therewith from the discharge pipe, the pipe having its discharge end vertical, a helical swirling member mounted to be stationary in said end of the pipe and having its axis vertical, the pipe extending along the sides of the helical member having its upper end open and of a diameter at least substantially as great as that of the helical member, the pipe and the helical member providing a helical path, with a vertical axis centered in the tube, and an open discharge end, for the discharging particles, whereby the particles enter the lower end of the tube, with an upward spiralling path centrally of the tube; additional gas introducing means to direct the other of said gases into the lower end of the tube and upwardly therein to mix with the gas from the discharge pipe to provide the combustible gas mixture aforesaid; means to regulate the total upward gas velocity to cause the particles to ascend continually and to discharge at the top of the tube, and means to regulate the ratio of fuel gas and air to provide a rich gas mixture that will maintain combustion upwardly in the tube through at least substantially all of its length, whereby the continually upward flow of glass particles may be maintained in the heat sufficiently long to fuse and assume spherical shape during their ascent in the tube.

10. In an apparatus for making small glass beads from irregularly shaped glass particles, a vertical elongated circular tube, and means for producing an upwardly flowing stream of burning gas mixture conveying said particles from the lower part out the top of the tube, the mixture comprising two gases one of which is air and the other of which is fuel gas; the stream producing means including a discharge pipe extending into the lower part of the tube; means to produce a flow of one of said gases at high velocity through said tube and out the discharge pipe; dry feeding means to feed the glass particles into said high velocity gas, the velocity of the gas being such as to cause the particles to become entrained in the flow and to emit therewith from the discharge pipe, the pipe having its discharge end vertical, a helical swirling member mounted to be stationary in said end of the pipe and having its axis vertical, the pipe extending along the sides of the helical member having its upper end open and of a diameter at least substantially as great as that of the helical member, the pipe and the helical member providing a helical path, with a vertical axis centered in the tube, and an open discharge end, for the discharging particles, whereby the particles enter the lower end of the tube, with an upward spiralling path centrally of the tube; additional gas introducing means to direct the other of said gases into the lower end of the tube and upwardly therein to mix with the gas from the discharge pipe to provide the combustible gas mixture aforesaid; means to regulate the total upward gas velocity to cause the particles to ascend continually and to discharge at the top of the tube, and means to regulate the ratio of fuel gas and air to provide a rich gas mixture that will maintain combustion upwardly in the tube through at least substantially all of its length, whereby the continually upward flow of glass particles may be maintained in the heat sufficiently long to fuse and assume spherical shape during their ascent in the tube, the tube having a larger cross section at its upper end than at its lower end to retard the upward velocity of the particles in the tube.

CHARLES C. BLAND.

REFERENCES CITED

The following references are of record in the file of this patent:

UNITED STATES PATENTS

| Number | Name | Date |
|---|---|---|
| 578,912 | Bridgman | Mar. 16, 1897 |
| 1,073,463 | Banes | Sept. 16, 1913 |
| 1,563,616 | Fassotte | Dec. 1, 1923 |
| 1,649,609 | McCrae | Nov. 15, 1927 |
| 1,924,788 | Hobson | Aug. 29, 1933 |
| 1,995,803 | Gilbert | Mar. 26, 1935 |
| 2,038,251 | Vogt | Apr. 21, 1936 |
| 2,044,680 | Gilbert | June 16, 1936 |
| 2,112,643 | Baensch et al. | Mar. 29, 1938 |
| 2,129,523 | Butler | Sept. 6, 1938 |
| 2,187,538 | Butler | Jan. 16, 1940 |
| 2,334,578 | Potters | Nov. 16, 1943 |
| 2,421,902 | Neuschotz | June 10, 1947 |

FOREIGN PATENTS

| Number | Country | Date |
|---|---|---|
| 307,763 | Great Britain | July 11, 1928 |